United States Patent [19]

Häll

[11] 4,135,466
[45] Jan. 23, 1979

[54] ARRANGEMENT FOR DAMPENING SOUND-VIBRATIONS IN ELONGATE HOLLOW MEMBERS SUCH AS MASTS OF SAILING VESSELS AND METHODS FOR DAMPENING SOUND-VIBRATIONS

[76] Inventor: Gunnar B. Häll, Karnvägen 8, Kungsör, Sweden

[21] Appl. No.: 814,902

[22] Filed: Jul. 12, 1977

[30] Foreign Application Priority Data

Jul. 15, 1976 [SE] Sweden ............................. 7604558

[51] Int. Cl.² .............................................. B63B 15/00
[52] U.S. Cl. ........................................ 114/90; 114/39
[58] Field of Search .............. 181/211, 284, 294, 296; 174/42, 70 R, 29; 114/90–94, 39, 102; 138/140, 144; 52/720, 721, 731

[56] References Cited

U.S. PATENT DOCUMENTS

| 2,020,194 | 11/1935 | Kuhlmann | 138/37 |
| 3,750,058 | 7/1973 | Bankert | 174/29 |
| 3,889,045 | 6/1975 | Logsdon | 114/90 |

*Primary Examiner*—Trygve M. Blix
*Assistant Examiner*—D. W. Keen
*Attorney, Agent, or Firm*—Birch, Stewart, Kolasch & Birch

[57] ABSTRACT

The present invention relates to arrangements for dampening sound-vibrations in elongate hollow members and more particularly to devices especially useful on sailing vessels to attentuate sound-vibrations generated by halyards slapping against hollow masts under the effect of wind or rolling and pitching movements of the vessel.

15 Claims, 4 Drawing Figures

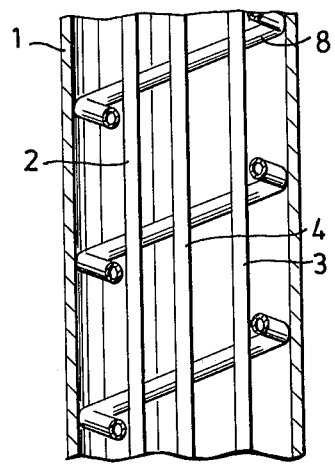
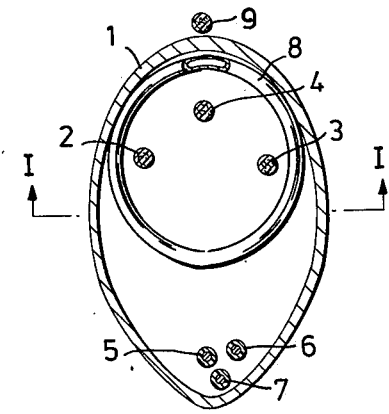
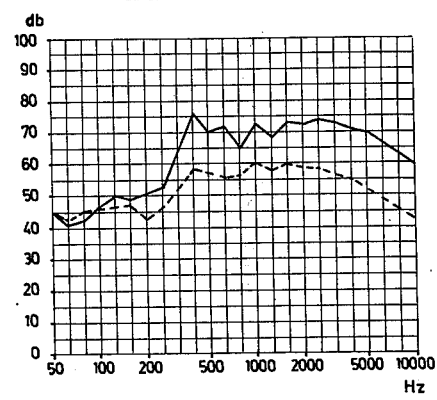

ARRANGEMENT FOR DAMPENING SOUND-VIBRATIONS IN ELONGATE HOLLOW MEMBERS SUCH AS MASTS OF SAILING VESSELS AND METHODS FOR DAMPENING SOUND-VIBRATIONS

FIELD OF THE INVENTION

The present invention is also applicable to related fields in which elongate hollow mast-like structures such as hollow flagpoles have lines extending longitudinally therealong and to methods for dampening sound-vibrations which might be generated when lines are free to slap against elongate hollow mast-like structures under the effect of the wind.

The present invention is considered also applicable to attenuate sound-vibrations otherwise generated in hollow tubular members such as ventilation ducts and the like.

BACKGROUND OF THE INVENTION

Present day sailing vessels are often equipped with hollow masts, made of a light-weight metal or glass fiber. A serious disadvantage encountered with hollow masts is the sound created when halyards slap against the mast, particularly when the sail is furled. The cabin of the sailing vessel will sometimes act as a resonator, irrespective of whether the mast is seated on the deck of the vessel or passes therethrough. At least some of the halyards of a large number of sailing boats fitted with hollow masts pass longitudinally inside the wall of the masts, and are thus not affected by the wind. Movement of the vessel in the water, such as rolling and pitching movements, however, cause the halyards to strike the inner surface of the mast, to cause a hammering sound.

As will be readily understood, the noise created by vibrations set up in the hollow masts of sailing vessels while said vessels are in harbor, is extremely irritating to those living in the close vicinity of the harbor.

Generally the strength and duration of sound-vibrations generated when striking an elongate hollow member will vary in dependence upon inter alia, the material from which the member is made and the shape and size of said member.

Anti-noise devices for the masts of sailing vessels and the like and methods for preventing noise which might be generated when lines are free to slap against mast-like structures are described in U.S. Pat. No. 3,918,383. According to one feature of that invention the anti-noise device is in the form of a corrugated ring encircling the mast and having longitudinal grooves therein to accommodate the halyards or lines which are thereby triangulated and placed under tension.

While an anti-noise device or a method for preventing noise according to U.S. Pat. No. 3,918,383 may prevent halyards or lines from slapping against the outside of a mast, said device and method obviously cannot prevent a halyard or line inside a hollow mast from slapping against the inner surface of the mast. Further said devices and methods cause no or little dampening or attenuation of sound-vibrations in hollow masts once the sound-vibrations have been generated. Finally anti-noise devices and methods for preventing noise according to U.S. Pat. No. 3,918,383 are only applicable to masts of mastlike structures having halyards or lines extending longitudinally therealong. Thus they are normally not useful for dampening sound emitted from or vibrations generated in tubular ventilation ducts.

SUMMARY OF THE INVENTION

An object of the present invention is to provide an arrangement for dampening sound-vibrations in elongate hollow bodies and in particular hollow masts.

A further object of the present invention is to provide an arrangement for preventing noise from being generated by halyards or lines extending longitudinally inside hollow masts and slapping against the inner surface of the masts.

Another object of the present invention is to provide an arrangement for preventing halyards extending longitudinally inside a hollow sailboat mast from damaging electrical conductors also extending longitudinally inside said mast.

Still another object of the present invention is to provide a method of supressing sound emitted from and attenuating vibrations in hollow tubular bodies.

In achieving the above and other objects of the invention a substantially helical device is arranged in the hollow member so as to abut the inner surface thereof.

According to a preferred embodiment the device is a tube of polypropylene formed in a helical shape.

In certain cases when the hollow member is a mast with halyards and electric conductors extending longitudinally inside the mast, the helical device is made to encircle the halyards but not the conductors in order to prevent the halyards from damaging the conductors. Conveniently, the helical body will have from between 4 to 6 turns per meter, depending upon the mast in which the helical device is to be fitted.

According to a preferred embodiment the radius of curvature of the helical device is adjusted to the internal width or diameter of the elongate hollow member in a manner such that the cross-sectional dimensions of the helical device, i.e., its extension in a plane perpendicular to the axis of the helix, prior to the insertion is somewhat larger than the internal width or diameter of the mast. When fitting such an elastic helical device to the mast it is first stretched so that its cross-sectional dimensions is smaller than the inner width or diameter of the mast. The helical device, while still stretched, is inserted into the mast, to the desired location therealong. The helical device is then permitted to relax until the turns of said device abut the internal surfaces of the hollow mast, thereby providing efficient contact between the device and said internal surface.

Other objects and features of the invention as well as advantages thereof will be apparent from the detailed descriptions of embodiments which follow hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a longitudinal sectional view of a hollow mast provided with a sound-vibration dampening device according to the invention;

FIG. 2 is a cross-sectional view of the mast shown in FIG. 1;

FIG. 4 shows test results obtained by means of the apparatus shown in FIG. 3.

DETAILED DESCRIPTION OF THE INVENTION

Figure 3:
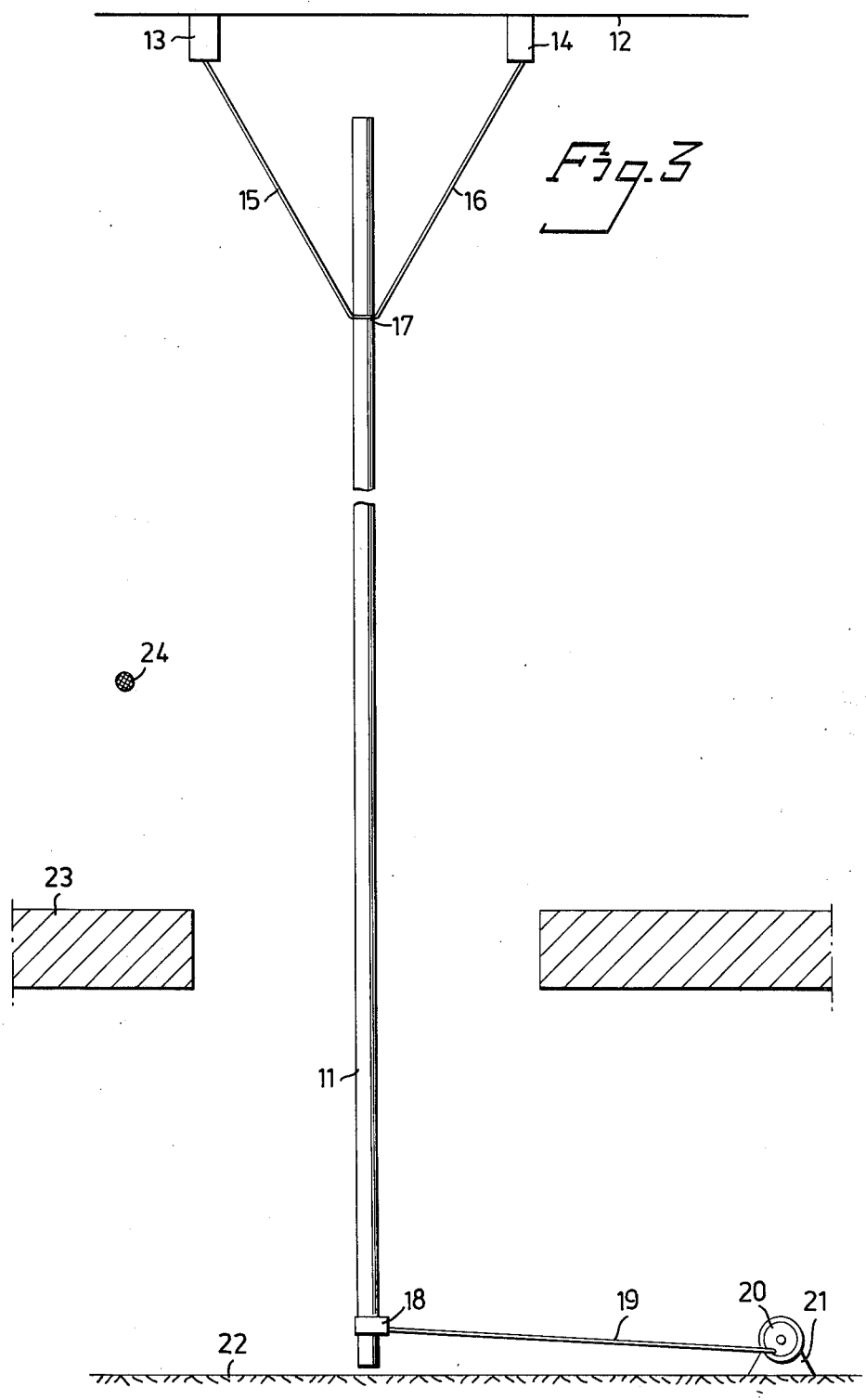
FIG. 3 illustrates an apparatus for testing the sound-vibration dampening ability of the dampening device used in accordance with the invention.

In FIGS. 1 and 2, the reference 1 identifies the tubular wall of a hollow, tubular mast for a sailing vessel, said mast being made, for example, of a light-weight metal or glass fiber. Extending through the mast are three halyards 2, 3 and 4, while a further halyard 9 is located outside the mast. Also extending through the hollow mast are three electrical conductors 5, 6 and 7 used, for example, for supplying current to lamps and/or for passing current from a wind gauge. As will readily be perceived, movement of a vessel provided with such a mast would cause the halyards to strike the wall of the mast, thereby causing the mast to vibrate and to emit sound. To prevent this, the mast of the illustrated embodiment is provided with an elastic vibration-dampening device 8 which is of substantially helical configuration and which is made from a plastics tubing, such as a polypropylene tube. The halyards 2, 3 and 4 are conveniently passed through the helical device 8 and the pitch of the helical device is suitable such as to prevent the halyards from striking the inner surface of the mast. The helical device 8 extends through the mast, in contact with the inner wall thereof, through a distance sufficient to ensure that vibrations set up in the mast by the halyard 9 are dampening by said device. Thus, the helical device will provide a sound-reducing effect by virtue of the fact that the halyards within the mast are unable to strike the inner wall thereof and by virtue of the fact that sound-vibrations set up in the mast by the external halyard 9 are dampened by said device.

The helical device 8 also serves to separate the halyards 2, 3 and 4 from the electrical conductors 5, 6 and 7. It is known that electrical cables extending through a hollow mast together with halyards have been damaged by the halyards as a result of motion of the vessel in the water. By providing the helical device 8 with a suitable pitch and by suitable dimensioning said device, it is possible to prevent the halyards 2, 3 and 4 from contacting the conductors 5, 6 and 7.

The parameters of the substantially helical device 8 will naturally depend upon the design of the mast. In addition to the properties of the material from which the device 8 is made, its ability to dampen sound-vibrations will depend upon the abutment of the device 8 with the inner surface of the mast. If the mast has a pronounced elliptical cross-sectional shape, or is stepped, it will be practically impossible to obtain continuous abutment of the device 8 with the inner surface of the mast throughout the entire length of the device 8. It is desirable, however, that each turn of the helical device abuts said inner surface at at least two diametrically opposite locations.

The pitch of the helical device is of importance to the vibration-dampening ability of said device. A large pitch will provide fewer surfaces through which the device may contact the inner surface of the mast and less possibility of preventing the halyards 2, 3 and 4 from striking said inner surface. A small pitch will provide more contact surfaces and a greater possibility of preventing the halyards 2, 3 and 4 from striking the inner surface of the mast. Thus, the helical device 8 shall provide a sufficient number of contact surfaces to effectively dampen sound-vibrations set up in the mast.

In certain instances, it is desirable that the helical device 8 has a pitch which enables it to be held in a predetermined location in the mast without the provision of auxiliary devices herefor. Another parameter which should be taken into account when determining the pitch of the helical device, is the weight of the mast. Conveniently, the helical body will have from between 4 to 6 turns per meter, depending upon the mast in which the helical device is to be fitted.

Vibration-dampening devices 8 intended for the hollow masts of sailing vessels will preferably be made from a plastics tubing, such as polypropylene tubing. An originally generally straight tubing may be formed into a helix in the following way. Firstly the tubing is wound with chosen pitch on a drum or mandrel the shape and size of which is adapted to that of the elongate hollow member. The ends of the tubing are attached to the drum or mandrel in order to prevent the forces and tensions in the tubing from straightening the tubing and separating it from the drum or mandrel. Secondly the drum or mandrel with wounded and attached tubing is heated in a oven. After about one hour in a temperature of about 100 degrees centigrade the tubing has softened sufficiently and substantially all tensions and forces in the tubing trying to straightening it have vanished. The drum or mandrel with the helix tubing is then taken out of the oven. Thirdly the hot drum or mandrel with tubing is rapidly chilled in cool water for a few minutes. A water temperature of about 4 degrees centigrade may be used. After the chilling the tubing may be separated from the drum or mandrel and will have a substantially helical shape.

To the knowledge of the inventor neither the temperatures nor the times mentioned above are critical. It is therefore believed that somewhat different temperatures and times as well as tubings made from other material than polypropylene may be used when manufacturing the helical device. However, it is believed that it is important to choose materials, temperatures and times making the helical device resilient with appropriate stiffness. Attempts to use polyamide instead of polypropylene have so far given inferior results.

In the case of masts having an internal width or diameter of between 80 and 120 mm, the tube may have an external diameter of 10 mm, while for masts having an internal width of diameter of between 125 and 165 mm there have been used a tubing having an external diameter of 12 mm.

The radius of curvature of the helical body is adjusted to the internal the diameter of the masts in a manner such that the cross-sectional dimensions of the helical device, i.e. its extension in a plane perpendicular to the axis of the helix, is somewhat larger than the internal width or diameter of the mast. In the case of masts having an internal width or diameter of 80–95 mm, 100–120 mm, 125–145 mm and 150–165 mm, cross-sectional diameters the device of 106 mm, 130 mm, 153 mm and 171 mm respectively, in the unloaded state of the device are preferred.

One preferred method of fitting the elastic, helical vibration-dampening device to the mast, is first to stretch the device, so that its diameter is smaller than the diameter or width of the hollow interior of the mast. The device 8, while still stretched, is then inserted into the mast, to the desired location therealong, and the device permitted to relax until the turns of said device abut the internal surfaces of the hollow mast, thereby providing efficient contact between the device and said internal surface. The device will then be held firmly in the mast by the frictional forces acting between the contacting surfaces of the device and the inner surface of the mast, provided that the device has a sufficient number of turns. The device may also be secured in its position in the mast by securing the top and/or the bottom of the device to the mast.

In a further method of fitting the helical device to a mast, the device is secured on the mast so as to be co-axial therewith, and then forcibly pulled into the mast, thereby stretching the device.

As will readily be perceived the invention may be applied to other hollow tubular, thin-wall bodies than the hollow masts of sailing vessels. Since the mode of operation of the helical device 8 illustrated in FIGS. 1 and 2 of the drawings is the same for all hollow bodies which may vibrate to produce sound, no description will be given of these other fields of application. For the sake of completeness, however, it should be mentioned that if the hollow body to which the helical device is fitted is intended to carry a flowing medium, such as air in the case of a ventilation duct, the cross-sectional shape of the plastic tubing should be decided in view of the resistance to flow of said medium presented by the device. A pronounced elliptical cross-sectional shape of the tubing is to be preferred in this instance, instead of the substantially circular cross-sectional shape exhibited by a vibration-dampening device for use with a hollow mast.

Alternatively, when the hollow body has an outer surface of a suitable shape such as circular cylindrical, the helical device 8 might eventually be mounted so as to abut the outer surface instead of the inner surface. Then the flow of medium through the hollow body will not be affected by the helical device.

In FIG. 3 there is illustrated a hollow mast, made by a Company trading under the name of Seldéns, intended for the type of sailing vessel designated in Sweden, Vindö 50. The halyards are placed within the mast, which is approximately 12.5 meters long. The mast is shown suspended from the ceiling 12 of a building by means of suspension devices 13, 14, 15 and 16 so as to be approximately 0.5 meters from the floor 22. The suspension devices are attached to the mast at an upper attachment point 17 located approximately 1.75 meters from the upper end of the mast.

One end of a rod 19 is attached to the mast at a lower attachment point 18. The other end of the rod 19 is attached to an eccentric plate 20 driven by a motor 21 attached to the floor 22 of the building. In operation, the motor, the eccentric plate and the rod impart a substantially sine-wave like movement to the mast, said movement having an amplitude of approximately 3.4 cm and a frequency of 1.7 Hz.

Positioned approximately 2 meters from the mast and approximately 6 meters above the floor 22 is a microphone for picking up sound emitted by the mast. The building also has an upper storey, the floor 23 of which is approximately 4 meters above the floor 22. The building-acoustic department of Chalmers Technical College have made comparison sound-level measurements with the apparatus shown in FIG. 3. The sound was recorded using a Bruel & Kjaer Precision Sound Level Meter type 2203 and a taperecorder of the type Nagra Kundelski IVS. The sound recorded was analysed with a Bruel & Kjaer Real Time Analyser type 3347 and Varian data system.

FIG. 4 shows the sound level, in dB, relative to $10^{-5}$ N/m$^2$ for different frequencies between 50 and 10,000 Hz. The full line relates to a mast in which no particular dampening means were provided, while the dash line relates to an identical mast provided with a substantially helical dampening device according to the invention in abutment with the inner surface of the mast, as shown in FIGS. 1 and 2.

As will be seen from FIG. 4, within the frequency range 315 Hz to 10,000 Hz there was obtained a reduction in sound level by approximately 10 to 19 dB. In order to measure the sound level in the reverberation field, sound recordings were also made at a distance of approximately 8 meters from the masts.

Since no significant differences in sound reduction were obtained it is thought unnecessary to describe the results obtained with these latter measuring operations.

It should be stressed that the position of the helical device 8 within the hollow mast shown in FIG. 2 is not the position believed to be the most natural or common, especially not when the described method of fitting is used. Generally, when the inner cross-section of the hollow mast is substantially elliptic in shape, the natural position of the helical device is where its turns may be widest. Accordingly, the position for a helical device within a hollow mast according to FIG. 2 believed to be the most natural, is somewhat nearer the conductors 5, 6 and 7 and farther away from the external halyard 9 than the position of device 8 indicated in FIG. 2.

It should be noted that although the sound-vibration dampening device may be given a true helical shape when manufactured, the shape of the device when mounted inside the hollow mast or member will normally slightly depart from the ideal true helical shape. Further there may be cases when it is preferred to give the sound-vibration dampening device a shape slightly deviating from that of an ideal helix already at the manufacture in order to obtain a better abutment against the inner surface of the mast or member when mounted. Accordingly the term substantially helical device is to be interpreted as including devices having a shape slightly different from that of an ideal helix.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An arrangement for reducing sound emitted from and suppressing vibrations generated in a hollow mast with at least one line and at least one electrical conductor extending longitudinally therein, and for preventing the line from damaging the conductor, the arrangement comprising a substantially helical polypropylene tube arranged so as to encircle the line but not the conductor and having from 4 to 6 turns per meter, substantially all of the turns abutting the inner surface of the mast at least at two opposite positions.

2. An arrangement for dampening sound vibrations comprising:
   a hollow mast;
   a line extending longitudinally outside said mast;

means for dampening sound emitted from and vibrations in said mast generated by the line slapping against the outside of said mast, said means including a substantially helical device arranged in said mast so as to abut an inner surface thereof.

3. An arrangement for dampening sound vibrations according to claim 2, wherein said arrangement includes an additional line extending longitudinally inside said mast and said substantially helical device arranged in said mast encircles said additional line and dampens sound emitted from and vibrations in said mast generated by said additional line slapping against the inside surface of said mast.

4. An arrangement for dampening sound vibrations according to claim 3, wherein said substantially helical device is a polypropylene tube.

5. An arrangement for dampening sound vibrations according to claim 3, wherein said substantially helical device is a tube having between 4 to 6 turns per meter.

6. An arrangement for dampening sound vibrations according to claim 2, wherein said substantially helical device is a polypropylene tube.

7. An arrangement for dampening sound vibrations according to claim 2, wherein said substantially helical device is a tube having between 4 to 6 turns per meter.

8. An arrangement for reducing sound emitted from and suppressing vibrations generated in a hollow mast with at least one line and at least one electrical conductor extending longitudinally therein, and for preventing the line from damaging the conductor, the arrangement comprising:
   a substantially helical device arranged so as to encircle said line but not said conductor;
   said substantially helical device including a predetermined number of turns per meter; and
   substantially all of said predetermined number of turns of said substantially helical device abut an inner surface of said mast at two opposite positions.

9. An arrangement for dampening sound vibrations comprising:
   a hollow mast; and
   a substantially helical device arranged within said mast so as to abut an inner surface thereof;
   whereby said substantially helical device encircles a member positioned longitudinally within said mast and dampens sound emitted from and vibrations in said mast generated by said member slapping against an inside surface of said mast.

10. An arrangement for dampening sound vibrations according to claim 9, wherein said substantially helical device dampens sound emitted from and vibrations in said mast generated by a member slapping against an outside surface of said mast.

11. An arrangement for dampening sound vibrations according to claim 10, wherein said substantially helical device is a polypropylene tube.

12. An arrangement for dampening sound vibrations according to claim 10, wherein said substantially helical device is a tube having between 4 to 6 turns per meter.

13. An arrangement for dampening sound vibrations according to claim 9, wherein said substantially helical device is a polypropylene tube.

14. An arrangement for dampening sound vibrations according to claim 9, wherein said substantially helical device is a tube having between 4 to 6 turns per meter.

15. A method for dampening sound vibrations in a hollow mast comprising the following steps:
   stretching an elastic, helical vibration dampening device so that its diameter is smaller than an interior width of a hollow mast;
   inserting said elastic, helical vibration dampening device within said hollow mast;
   relaxing said elastic, helical vibration dampening device so that it abuts against said interior width of said hollow mast; and
   positioning a line so as to be encircled by said elastic helical vibration dampening device and dampening sound emitted from and vibrations in said mast generated by said line slapping against the inside surface of said mast.

* * * * *